(12) United States Patent
Gaida et al.

(10) Patent No.: US 10,738,461 B2
(45) Date of Patent: Aug. 11, 2020

(54) INSTALLATION UNIT FOR A BATHROOM

(71) Applicant: Grohe AG, Hemer (DE)

(72) Inventors: Waldemar Gaida, Duesseldorf (DE); Achim Mielke, Porta Westfalica (DE)

(73) Assignee: Grohe AG, Hemer (DE)

(*) Notice: Subject to any disclaimer, the term of this patent is extended or adjusted under 35 U.S.C. 154(b) by 256 days.

(21) Appl. No.: 15/695,264

(22) Filed: Sep. 5, 2017

(65) Prior Publication Data
US 2018/0066423 A1 Mar. 8, 2018

(30) Foreign Application Priority Data

Sep. 2, 2016 (DE) .......................... 10 2016 010 576

(51) Int. Cl.
| | | |
|---|---|---|
| E03C 1/05 | (2006.01) | |
| E04B 1/348 | (2006.01) | |
| E04H 1/12 | (2006.01) | |
| H02J 7/00 | (2006.01) | |
| E04C 2/52 | (2006.01) | |
| H02J 7/02 | (2016.01) | |

(52) U.S. Cl.
CPC .......... *E04B 1/34869* (2013.01); *E03C 1/055* (2013.01); *E04H 1/1266* (2013.01); *E04C 2/52* (2013.01); *H02J 7/00036* (2020.01); *H02J 7/025* (2013.01)

(58) Field of Classification Search
CPC .......... E04C 2/52; E04H 1/1266; H02J 7/025; E04B 1/34869; A61H 33/005; A61H 2033/0058; A61H 2033/0066; A61H 2033/0007; A61H 2033/0075; A61H 2033/0079

USPC ...................... 52/173.1; 4/597, 601, 615, 634
See application file for complete search history.

(56) References Cited

U.S. PATENT DOCUMENTS

| | | | | |
|---|---|---|---|---|
| 4,606,085 A * | 8/1986 | Davies | ................... | A61B 90/80 4/619 |
| 5,031,258 A * | 7/1991 | Shaw | ...................... | E03C 1/057 242/563 |
| 5,199,118 A * | 4/1993 | Cole | ......................... | A47K 1/04 4/619 |
| 5,322,086 A * | 6/1994 | Sullivan | .................. | E03C 1/052 137/601.14 |
| 5,625,908 A * | 5/1997 | Shaw | ...................... | E03C 1/057 4/623 |
| 5,694,653 A * | 12/1997 | Harald | ..................... | E03C 1/057 4/559 |
| 5,781,942 A * | 7/1998 | Allen | .................. | G08B 21/245 4/623 |
| 8,296,875 B2 * | 10/2012 | Loberger | ................. | E03C 1/057 4/623 |

(Continued)

*Primary Examiner* — Joshua J Michener
*Assistant Examiner* — James J Buckle, Jr.
(74) *Attorney, Agent, or Firm* — Muncy, Geissler, Olds & Lowe, P.C.

(57) ABSTRACT

An installation unit for a bathroom, having at least one wall cladding element covering a bathroom wall. At least one transmitter unit having at least one associated transmitter antenna, which is part of a wireless power and/or signal transmission device, is disposed on the rear side, facing away from the visible side, of the wall cladding element. The transmitter unit can be coupled in a wireless power and/or signal transmitting connection to a receiver unit positioned in the bathroom.

4 Claims, 3 Drawing Sheets

(56) References Cited

U.S. PATENT DOCUMENTS

| | | | | |
|---|---|---|---|---|
| 8,893,320 B2* | 11/2014 | Klicpera | ............... | B05B 12/004 |
| | | | | 4/601 |
| 9,061,307 B2* | 6/2015 | Klicpera | ................... | B05B 1/18 |
| 9,526,380 B2* | 12/2016 | Hamilton | ............. | A47K 5/1217 |
| 9,857,096 B2* | 1/2018 | Mihu | ...................... | F24H 1/101 |
| 2010/0327766 A1* | 12/2010 | Recker | ................... | H05B 45/00 |
| | | | | 315/291 |
| 2011/0186154 A1* | 8/2011 | Klicpera | ................. | B67D 7/08 |
| | | | | 137/551 |
| 2013/0014451 A1* | 1/2013 | Russell | ............. | E04L 31/34869 |
| | | | | 52/79.1 |
| 2013/0048090 A1* | 2/2013 | Yang | ...................... | F16K 31/02 |
| | | | | 137/1 |
| 2014/0023352 A1* | 1/2014 | Jurczyszak | .......... | H05B 1/0283 |
| | | | | 392/466 |
| 2014/0131459 A1* | 5/2014 | Dorendorf | ........... | F24F 11/0079 |
| | | | | 236/49.3 |
| 2014/0174556 A1* | 6/2014 | Herbert | ................... | E03C 1/057 |
| | | | | 137/78.1 |
| 2014/0246099 A1* | 9/2014 | Herbert | ................... | E03C 1/057 |
| | | | | 137/78.1 |
| 2015/0224525 A1* | 8/2015 | Klicpera | ................... | B05B 1/18 |
| | | | | 4/615 |
| 2016/0245546 A1* | 8/2016 | Mihu | ................... | H05B 1/0283 |
| 2016/0378322 A1* | 12/2016 | Klicpera | ............. | G06F 3/04886 |
| | | | | 715/773 |

* cited by examiner

INSTALLATION UNIT FOR A BATHROOM

This nonprovisional application claims priority under 35 U.S.C. § 119(a) to German Patent Application No. 10 2016 010 576.3, which was filed in Germany on Sep. 2, 2016, and which is herein incorporated by reference.

BACKGROUND OF THE INVENTION

Field of the Invention

The invention relates to an installation unit for a bathroom.

Description of the Background Art

Wireless power and/or signal transmission is used in different technical fields. A wireless power and/or signal transmission of this kind is carried out, for example, by means of inductive coupling, in which wireless power and/or signal transmission occurs from a transmitter unit with an associated transmitter antenna to a receiver unit with an associated receiver antenna. Application examples are the wireless charging of batteries of mobile devices, for instance, mobile phones or toothbrushes.

In modern bathroom architecture, electronically controlled functional units are increasingly requested by the end user. In this regard, the problem of an electrical power supply and/or signal supply arises time and again. A connection cable for signal and/or power transmission is very disruptive in this regard.

In a generic installation unit for a bathroom, at least one wall cladding element is provided which covers a bathroom wall. The installation unit can have a mounting frame on which, e.g., fixture components, a toilet tank, and/or a toilet bowl can be installed. The mounting frame, together with the units mounted thereon, can be covered with the aid of wall cladding elements, which are made, for example, of plasterboard to which tiles are glued on the visible side.

SUMMARY OF THE INVENTION

It is therefore an object of the invention to provide an installation unit for a bathroom in which electronically controlled functions can be realized in a simple manner.

According to an exemplary embodiment, at least one transmitter unit having at least one associated transmitter antenna can be disposed on the rear side, facing away from the visible side, of the wall cladding element. The transmitter unit is part of a wireless power and/or signal transmitting device. As such, the transmitter unit can be brought into a wireless power and/or signal transmitting connection to a receiver unit positioned in the bathroom.

In an embodiment, the receiver unit with the associated receiver antenna can be installed in a mobile device, for instance, a mobile phone or toothbrush. For a power supply for the mobile device or for the wireless charging of a mobile device battery, electrical power can be transmitted wirelessly from the transmitter unit to the receiver unit in the mobile device.

By way of example, the wall cladding element can have a particularly horizontal mobile device storage area on its visible side. This can be labeled as such for the user. When the mobile device is placed on the storage area, a wireless power and/or signal transmission can therefore take place.

In a technical implementation, the transmitter unit and the associated transmitter antenna can be components separate from one another which are connected to one another via an electrical connecting line. In this case, the transmitter antenna can be installed spatially independent of the transmitter unit.

In an application, a washbasin is installed on the wall cladding element. The transmitter unit can be disposed on the rear side of the wall cladding element. In contrast, the transmitter antenna can be mounted, spatially independent therefrom, directly on the washbasin, in particular on its underside. The washbasin can have a corresponding mobile device storage area, on which the mobile device can be placed for wireless power and/or signal transmission.

In an embodiment, the wall cladding element can be placed on the ceiling side, that is, cover a bathroom ceiling wall and additionally bound a shower area at the top. In the shower area, a shower head can be installed, fixed in terms of motion, with a clear height offset below the wall cladding element. By way of example, the shower head can have at least one electrically operable actuator, with which shower functions can be adjusted, for example, a jet type, light, sound, aroma, and/or steam function. The electrically operable actuator can be controlled, for example, by a wall-mounted control unit on the user side.

In an embodiment, the transmitter antenna can be integrated in a ceiling lamp alone or together with the associated transmitter unit. This ceiling lamp, supplemented in this way, can then be made in different sizes so that the horizontal distance between an existing ceiling connection and a suitable position of the transmitter antenna to the receiver antenna can be bridged.

In an embodiment, the above-mentioned receiver unit with the associated receiver antenna can be encapsulated directly in the shower head. In this case, a wireless power and/or signal transmission can occur between the transmitter unit installed on the wall cladding element on the ceiling side, and the receiver unit on the shower head side for the power supply of the electrical shower head actuator and/or for operating the electrical shower head actuator. It is advantageous in regard to efficient power and/or signal transmission, if the transmitter antenna is disposed in the vertical direction substantially in alignment with the receiver antenna on the shower head side.

In an embodiment, the receiver unit and/or the receiver antenna can be mounted in a materially and/or positively locking manner on the wall cladding element and/or the washbasin, for example, with glued, screwed, or clip connections. The wall cladding element can be provided particularly preferably together with the receiver unit and optionally with the receiver antenna as a subassembly unit.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
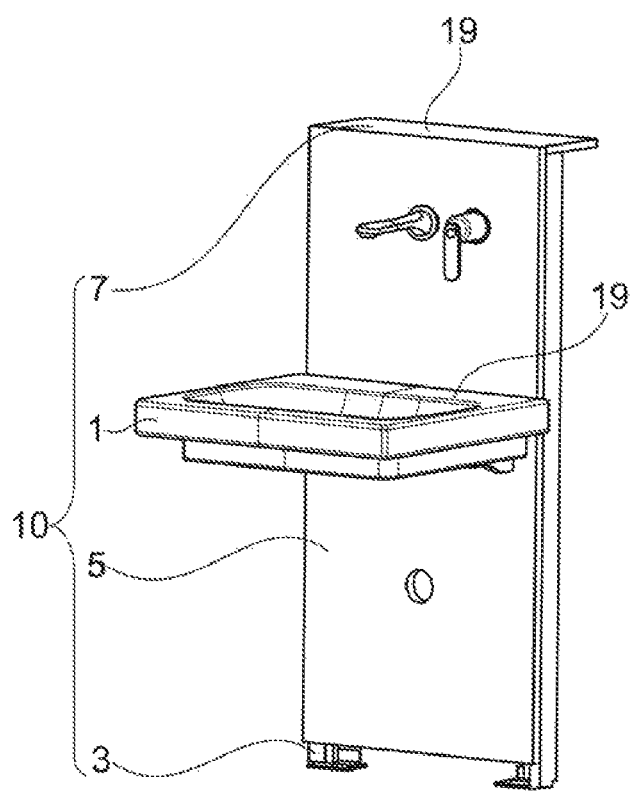
FIGS. 1 to 4 show, in different views, an installation unit with a washbasin mounted thereon according to an exemplary embodiment.
Figure 2:
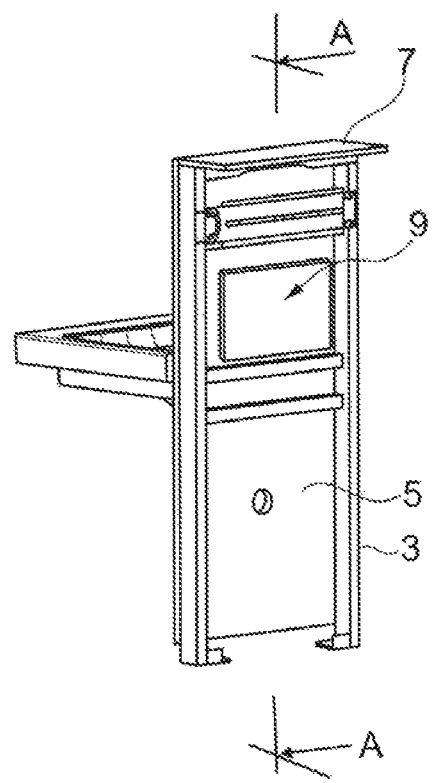
Figure 3:
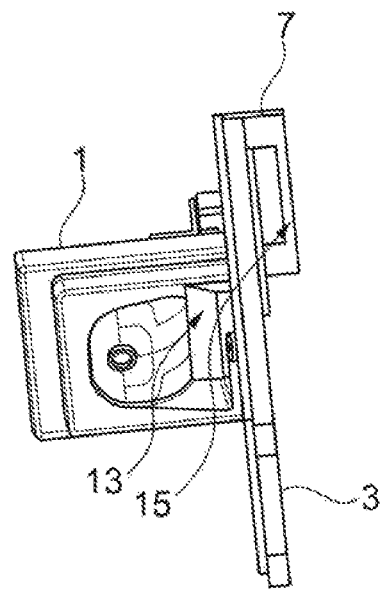

FIGS. 1 to 3 show according to an exemplary embodiment an installation unit 10 in which a washbasin 1 is installed. Installation unit 10 has a mounting frame 3 to which fixture components (not shown) as well as a horizontal wall cladding element 5 and a vertical wall cladding element 7 are fastened. A transmitter unit 9 (FIG. 2), which is part of a wireless power and/or signal transmission device 11 (FIG. 4), is disposed on the rear side, facing away from the visible side, of the vertical wall cladding element 5. Transmitter unit 9 is connected to the power supply network via supply lines 12. In addition, two transmitter antennas 13, 15 are associated with transmitter unit 9 in FIG. 3. These are disposed as components separate from transmitter unit 9 in installation unit 10 and are electrically in contact with transmitter unit 9 via connecting lines 17 (only shown in FIG. 4).

In FIG. 3, first transmitter antenna 13 is disposed on an underside of washbasin 1, namely, opposite to a top horizontal mobile device storage area 19 of washbasin 1. Second transmitter antenna 15 is disposed on the lower side of the upper horizontal wall cladding element 7, which likewise provides a horizontal mobile device storage area 19. Both mobile device storage areas 19 can be emphasized by suitable labeling for the user.

Figure 4:
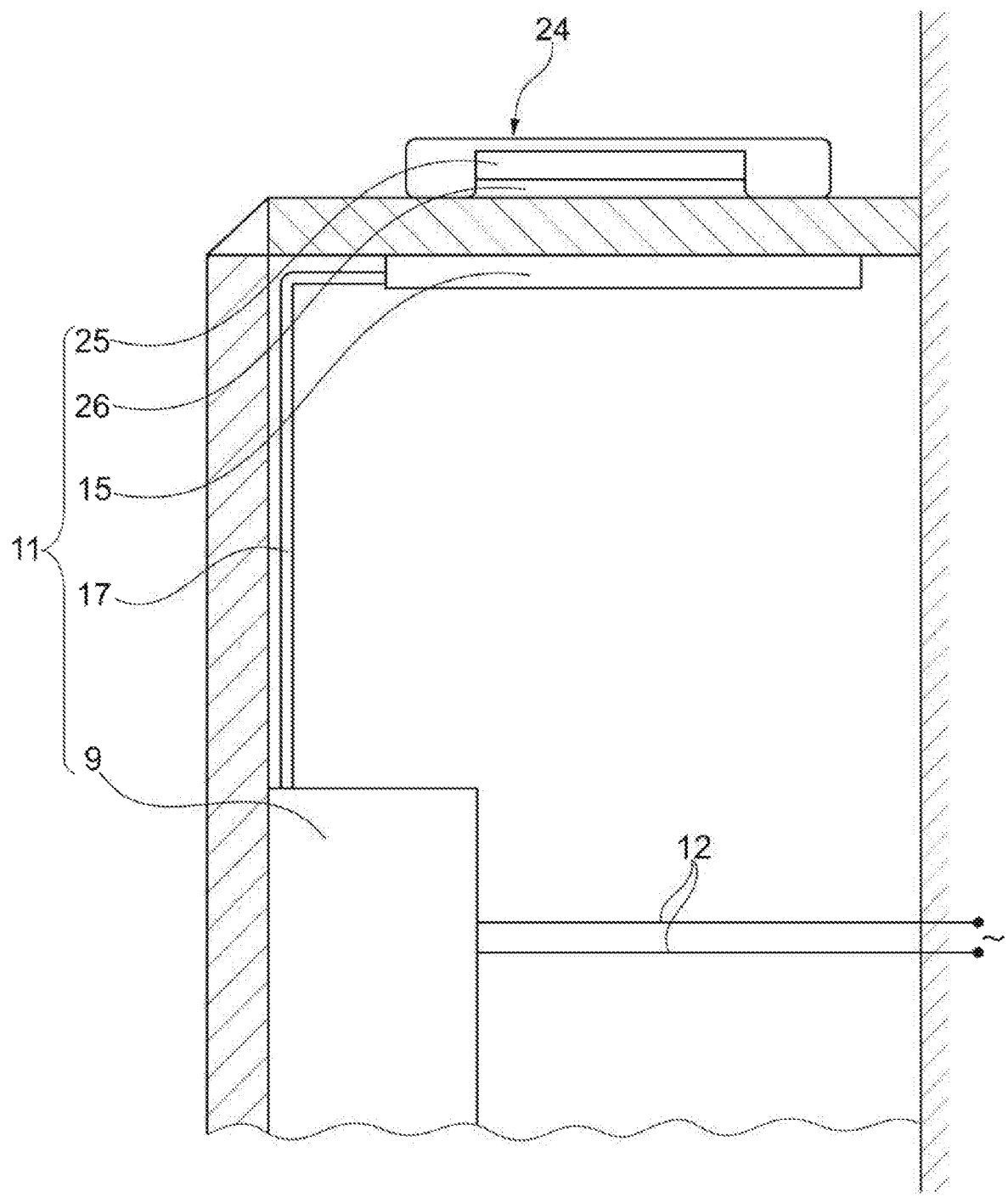

In the enlarged partial sectional view of FIG. 4, a mobile device 24 is placed on storage area 19 of upper wall cladding element 7 in which a receiver unit 25, wirelessly communicable with transmitter unit 9, with associated receiver antenna 26 is integrated. As a result, a wireless signal and/or power transmission is established between transmitter unit 9 and receiver unit 25 integrated in mobile device 24 in order to supply mobile device 24 with electrical power and/or to charge a battery of mobile device 24.

As an alternative to FIGS. 1 to 4, a toilet bowl and a toilet tank, which is covered by the vertical and horizontal wall cladding elements 5, 7, can be installed in installation unit 10 instead of washbasin 1. In this case, only the upper horizontal wall cladding element 7 can provide a mobile device storage area 19 so that transmitter antenna 15 is located only below horizontal wall cladding element 7.

Figure 5:
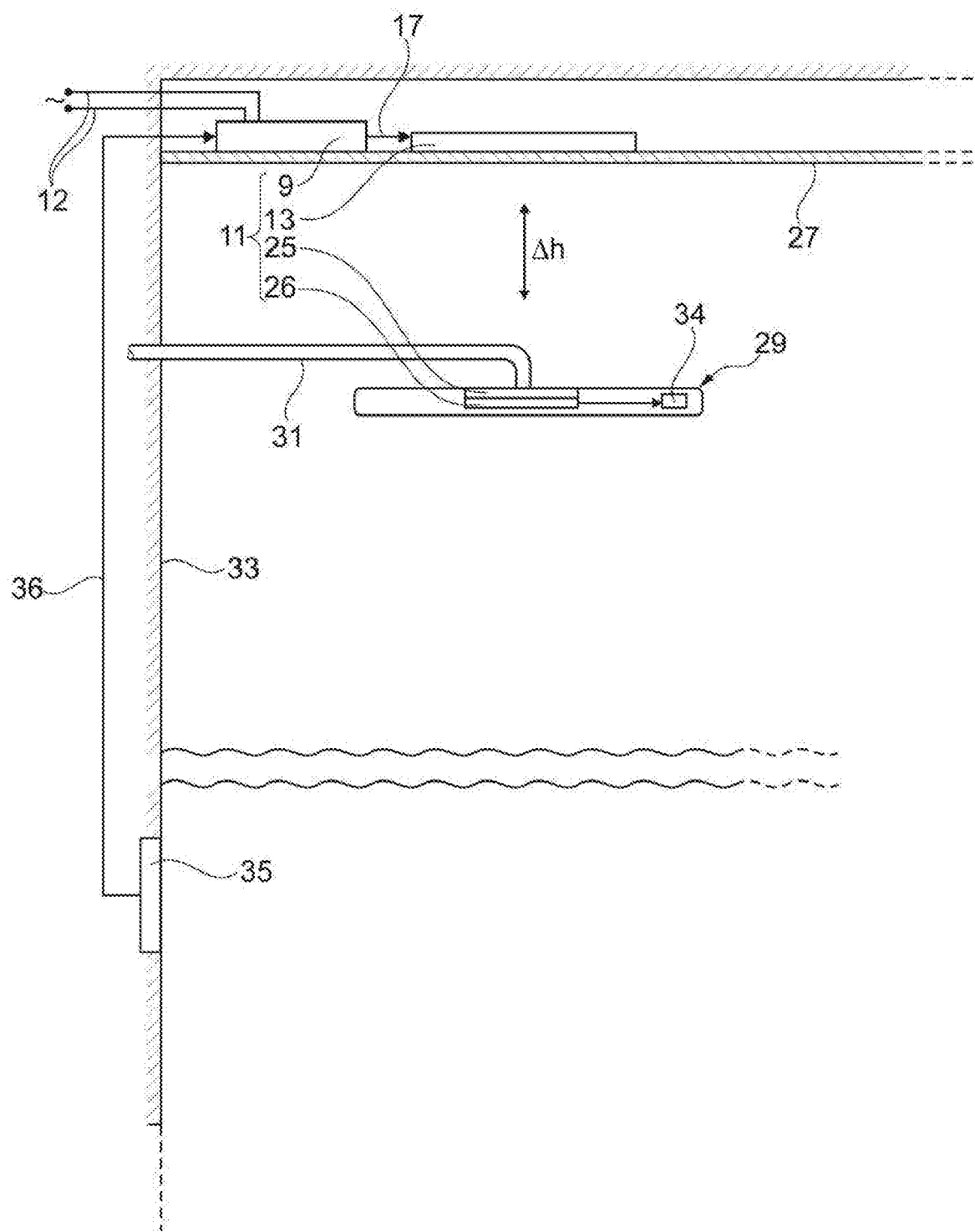
FIG. 5 shows in a rough schematic illustration a shower area with realized wireless power and/or signal transmission.

FIG. 5 shows a shower area in a bathroom. Its room ceiling is covered by a wall cladding element 27, which bounds the shower area at the top. In the shower area, a shower head 29 is mounted, fixed in terms of motion, on a bathroom side wall 33 with the aid of a mixed-water supply line 31. In FIG. 5, shower head 29 is spaced apart from wall cladding element 27 by a clear height offset Δh. As indicated in FIG. 5, receiver unit 25 with associated receiver antenna 26 is integrated in shower head 29. This forms a wireless signal and/or power transmission device 11 together with transmitter unit 9, which is mounted on the ceiling-side wall cladding element 27, with associated transmitter antenna 13. In order to support fault-free wireless power and/or signal transmission, transmitter antenna 13 is disposed in the vertical direction in alignment above receiver antenna 26 on the shower head side.

Electrical power and control signals are passed to an electrically operable actuator 34, located in shower head 29, via the wireless signal and/or power transmission device 11. An adjustment of the jet type can be made, for example, by actuator 34. In order to carry out the above shower function, actuator 34 is connected via a wireless signal and/or power transmission device 11 in signal connection 36 to an operating unit 35 which can be actuated by the user.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An installation unit for a bathroom, the installation unit comprising:
   at least one wall cladding element;
   at least one transmitter having at least one associated transmitter antenna is arranged on a rear side, facing away from a visible side, of the wall cladding element, the transmitter being adapted to be wirelessly coupled to a receiver arranged in the bathroom,
   wherein the wall cladding element covers a bathroom ceiling and bounds a shower area at the top, in which a shower head is installed, fixed in terms of motion, with a clear height offset below the wall cladding element, and wherein the shower head has at least one electrically operable actuator to adjust at least one shower function, the shower function including a jet type, a light, sound, aroma, and/or steam function.

2. The installation unit according to claim 1, wherein the transmitter antenna is integrated in a ceiling lamp alone or together with the associated transmitter.

3. The installation unit according to claim 1, wherein the receiver has an associated receiver antenna, wherein the receiver and the associated receiver antenna are integrated in the shower head, and wherein a wireless power and/or signal transmission to the receiver integrated in the shower head occurs for the power supply of the electrically operable actuator and/or for operating the electrically operable actuator.

4. The installation unit according to claim 3, wherein the transmitter antenna is disposed in the vertical direction substantially in alignment with the receiver antenna on the shower head side.

* * * * *